US011919185B2

(12) United States Patent
Kopelas

(10) Patent No.: US 11,919,185 B2
(45) Date of Patent: Mar. 5, 2024

(54) RAZOR HANDLE WITH SUSPENSION AND PIVOT DEVICE

(71) Applicant: BIC VIOLEX S.A., Anoixi (GR)

(72) Inventor: Panagiotis Kopelas, Anoixi (GR)

(73) Assignee: BIC Violex Single Member S.A., Anoixi (GR)

(*) Notice: Subject to any disclaimer, the term of this patent is extended or adjusted under 35 U.S.C. 154(b) by 358 days.

(21) Appl. No.: 17/286,927

(22) PCT Filed: Oct. 30, 2019

(86) PCT No.: PCT/EP2019/079740
§ 371 (c)(1),
(2) Date: Apr. 20, 2021

(87) PCT Pub. No.: WO2020/089340
PCT Pub. Date: May 7, 2020

(65) Prior Publication Data
US 2021/0354322 A1 Nov. 18, 2021

(30) Foreign Application Priority Data
Oct. 31, 2018 (EP) .................................... 18203762

(51) Int. Cl.
*B26B 21/52* (2006.01)
*B26B 21/22* (2006.01)

(52) U.S. Cl.
CPC .......... *B26B 21/521* (2013.01); *B26B 21/225* (2013.01)

(58) Field of Classification Search
None
See application file for complete search history.

(56) References Cited

U.S. PATENT DOCUMENTS 1,639,441 A * 8/1927 Spahr ...................... B26B 21/52 403/138
5,953,825 A * 9/1999 Christman ............ B26B 21/225 30/527
7,895,754 B2 3/2011 Blackburn
8,671,577 B2 * 3/2014 Brown ................. B26B 21/521 30/526
(Continued)

FOREIGN PATENT DOCUMENTS

EP 2227360 A1 9/2010
EP 2691216 A1 2/2014
(Continued)

OTHER PUBLICATIONS

International Search Report and Written Opinion in corresponding Application No. PCT/EP2019/079740, dated Jan. 7, 2020, (12 pages).

*Primary Examiner* — Hwei-Siu C Payer
(74) *Attorney, Agent, or Firm* — Bookoff McAndrews, PLLC

(57) ABSTRACT

This application relates to a suspension housing configured to provide a movable connection between a razor blade assembly and a razor handle. The suspension housing comprises a connector being movably attached to the razor blade assembly and a suspension device operably coupled to the connector. The suspension device is configured to allow axial movement of the connector along a main axis, and rotational movement of the connector about the main axis.

13 Claims, 5 Drawing Sheets

(56) References Cited

U.S. PATENT DOCUMENTS

| | | | | |
|---|---|---|---|---|
| 9,579,809 | B2 | 2/2017 | Hawes | |
| 9,707,690 | B2 | 7/2017 | Hodgson | |
| 9,751,229 | B2 | 9/2017 | Hodgson | |
| 9,764,487 | B2 | 9/2017 | Robertson et al. | |
| 10,814,508 | B1 * | 10/2020 | Gilman | B26B 21/4062 |
| 10,843,357 | B2 * | 11/2020 | Jang | B26B 21/225 |
| 10,960,561 | B2 * | 3/2021 | Kim | B26B 21/225 |
| 10,974,403 | B2 * | 4/2021 | Chang | B26B 21/522 |
| 2015/0174775 | A1 | 6/2015 | Hodgson | |
| 2016/0121498 | A1 | 5/2016 | Johnson | |
| 2017/0326744 | A1 | 11/2017 | Liberatore | |
| 2021/0354322 | A1 * | 11/2021 | Kopelas | B26B 21/225 |

FOREIGN PATENT DOCUMENTS

| | | | |
|---|---|---|---|
| EP | 2711146 | A1 | 3/2014 |
| EP | 3 486 048 | A2 * | 5/2019 |
| WO | 2017024156 | A1 | 2/2017 |

* cited by examiner

RAZOR HANDLE WITH SUSPENSION AND PIVOT DEVICE

CROSS-REFERENCE TO RELATED APPLICATION(S)

This application is a national stage application of the International Application PCT/EP2019/079740, filed on 30 Oct. 2019, now published as WO/2020/089340, and which claims benefit from the European Patent Application EP 18203762.2, filed on 31 Oct. 2018, their content being incorporated herein by reference.

TECHNICAL FIELD

The disclosure concerns a suspension device and a razor having a suspension device, the suspension device allowing the razor to relieve excess pressure applied on a user's skin, and thus offer a smoother and safer shaving experience.

BACKGROUND

During shaving, the pressure applied to the handle by the user is transferred to the blade assembly and onto the skin. Excess blade pressure applied on the skin increases the risk of nicks and cuts during a shaving operation. To address this issue, most of the advanced razors presently on the market have pivoting mechanisms that allow the blade assembly to follow the contours of the skin and compensate for the excess applied pressure on the skin. Additionally, razors that include devices that urge the blade assembly into a rest position, which also helps control the pressure applied on the skin, have been introduced into the market as well.

For example, EP 2 227 360 discloses a blade unit is mounted to a handle, the blade unit is adapted to move relative to the handle about a first pivot axis and a second pivot axis which allows the blade unit to follow the contours of the skin during shaving. The blade unit includes magnetic elements that urge the blade unit into a rest position.

For example, U.S. Pat. No. 9,751,229 B2 discloses a blade unit that includes at least one biasing magnetic element providing a pivot return force.

In another example, EP 2 691 216 discloses a blade unit that has a rotatable blade unit with a maximum rotation of from about 10° to about 30°, or more specifically about 15°.

For example, U.S. Pat. No. 9,764,487 B2 discloses a pivotable blade unit including a resistive pivot mechanism that provides a biasing force which urges the blade cartridge towards an initial starting position.

For example, US 2016/0121498 A1 discloses a magnetic handle element that is pivotable relative to the handle.

For example, U.S. Pat. No. 7,895,754 B2 discloses a razor having a blade unit pivotable relative the handle about a longitudinal axis. The blade unit can be biased to a rest position using a magnetic return force.

However, a problem still exists where the user may be unable to adequately control the pressure applied on the skin in areas where it is difficult to reach and manipulate the handle thus leading to nicks and cuts.

SUMMARY

The above summary is not intended to describe each and every implementation of the concept. In particular, selected features of any illustrative embodiment within this disclosure may be incorporated into additional embodiments unless clearly stated to the contrary or otherwise incompatible.

In aspects, a suspension housing configured to provide a movable connection between a razor blade assembly and a razor handle is provided. The suspension housing comprises a connector being movably attached to the razor blade assembly and a suspension device. The suspension device is operably coupled to the connector and comprises one or more magnets, where the suspension device is configured to allow axial movement of the connector along a main axis and rotational movement of the connector about the main axis.

In aspects, the suspension housing may be connected to the razor handle. The razor handle may extend from a proximal end to a distal end along the main axis, where the connector may be movably attached inside the suspension housing such that it can move axially along the main axis and rotate about the main axis.

In aspects, the suspension device may comprise two or more magnets.

In aspects, a first magnet may be fixedly attached to the inside of the suspension housing. A second magnet may be fixedly attached to the movable connector.

In aspects, the magnets may be annular.

In aspects, the magnets may form a pair of correlated magnets.

In aspects, the suspension device may comprise a spring.

In aspects, the suspension device may further include connection portions that are configured to connect with a pair of legs of the connector.

In aspects, the pair of legs of the connector may be offset from the main axis to form a gap therebetween.

In aspects, the suspension device and the connector may be configured to move in concert.

In aspects, a razor is provided. The razor comprises a razor blade assembly and the aforementioned suspension housing, where the suspension housing includes a cavity having at least one stop, wherein the stop is configured to limit the movement of the connector.

In aspects, the razor may include a first rotational stop and a second rotational stop. The first and second rotational stops may be configured to limit rotational movement of the connector about the main axis.

In aspects, the first and second rotational stops may be configured to limit the rotational movement of the connector to a range of −30°≤30° relative to a rest position, where the connector may include connector stops that are configured to engage at least one housing stop.

In aspects, the razor may include an adapter that is configured to attach the blade assembly to the connector.

In aspects, the razor blade assembly and the connector may be adapted to axially translate and/or rotate along the main axis when a force is applied to the razor blade assembly exceeds a return force that the suspension device applies on the razor assembly.

According to the above aspects, a user is able to adequately control the pressure applied on the skin in areas where it is difficult to reach and manipulate the handle thus reducing the risk of nicks and cuts.

BRIEF DESCRIPTION OF THE DRAWINGS

The disclosure may be more completely understood in consideration of the following detailed description of non-limiting aspects of the disclosure in connection with the accompanying drawings, in which.

DETAILED DESCRIPTION

As used in this disclosure and the appended claims, the singular forms “a”, “an”, and “the” include plural referents unless the content clearly dictates otherwise. As used in this disclosure and the appended claims, the term “or” is generally employed in its sense including “and/or” unless the content clearly dictates otherwise.

The following detailed description should be read with reference to the drawings. The detailed description and the drawings, which are not necessarily to scale, depict illustrative aspects and are not intended to limit the scope of the present disclosure. The illustrative aspects depicted are intended only as exemplary.

Figure 1:
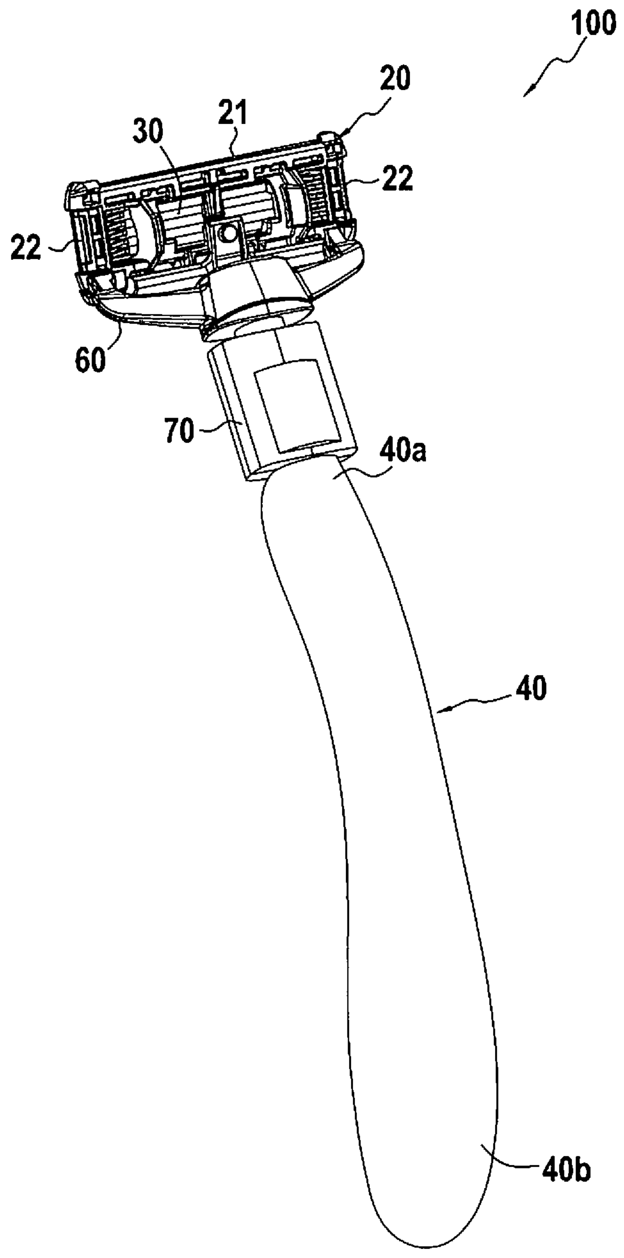
FIG. 1 details a front view of a razor having a suspension device.

An aspect of the disclosure is shown in FIG. 1, which is a front view of a razor 100 having a blade assembly 20, an adapter 60, a suspension housing 70, and a handle 40. The blade assembly 20 and the adapter 60 may be removably attached to the suspension housing 70 and the handle 40. The blade assembly 20 may be removably attached to the adapter 60. The razor 100 may be specifically adapted for shaving facial, head, and/or body hair.

The blade assembly 20 may be formed in a prism shape having, e.g., a rectangular base. In alternatives, the blade assembly 20 may have any other prism shape, for example an oval shape. The blade assembly 20 may also include a cap 21 and a pair of retainers 22 adapted to retain the position of at least one blade 30 within the blade assembly 20. The blade assembly 20 may include a plurality of blades 30, however, it is contemplated that the blade assembly 20 may have any number of blades (e.g., one, two, three, four, or more).

The handle 40 may extend along a central, main axis A-A. The handle may have a distal portion 40*a* and a proximal portion 40*b*. The handle 40 may be shaped to better adapt to the natural contours of a hand. The handle 40 and the suspension housing 70 may be connected. It is envisioned that the suspension housing 70 and the handle 40 may be a single component. However, it is also envisioned that the suspension housing 70 and the handle 40 are separate components and may be connected by any suitable means, for example a snap fitting, press fitting, or welding.

Figure 2A:
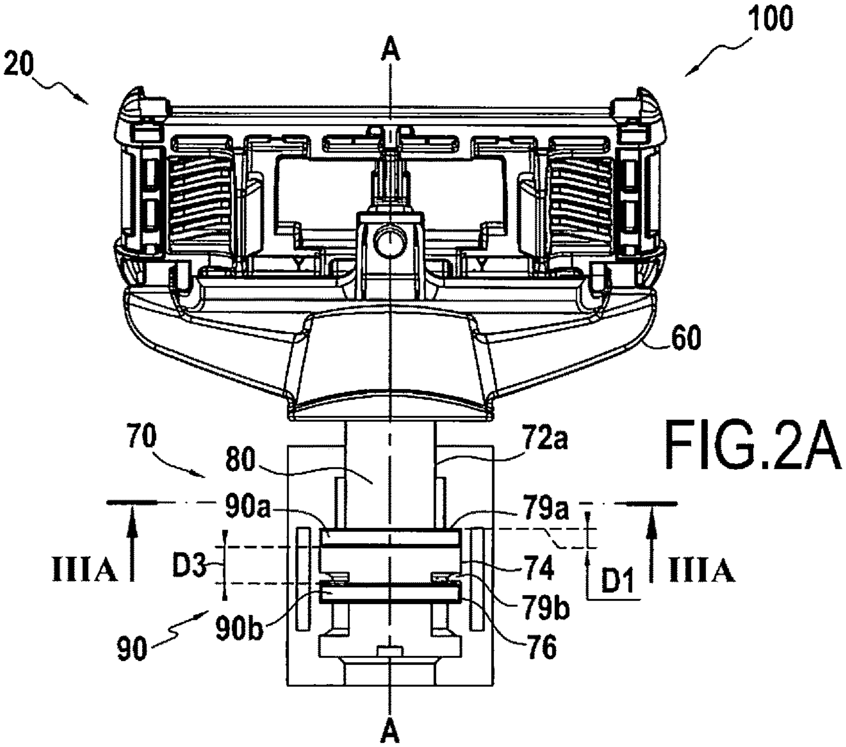
FIG. 2A details a cut-away view of the razor of FIG. 1 having a suspension device in a first position.
Figure 2B:
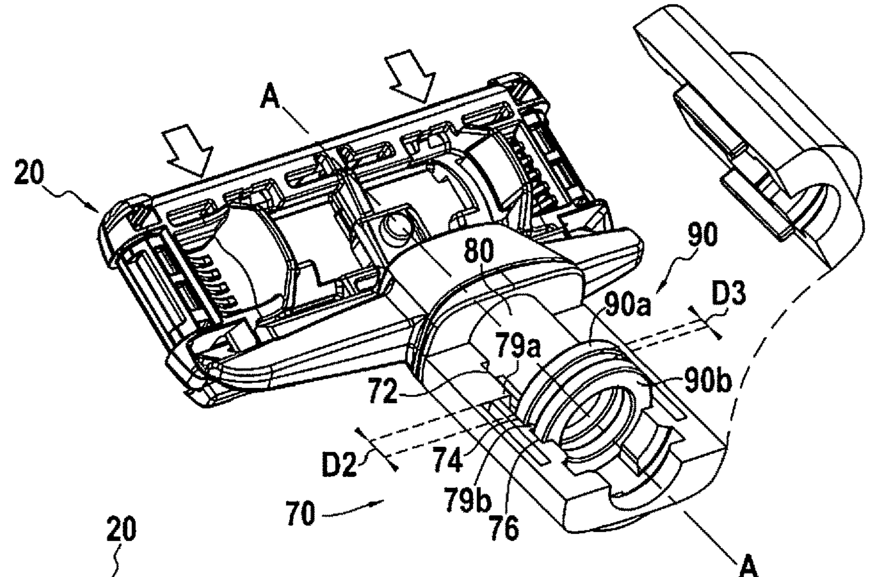
FIG. 2B details a cut-away view of the razor of FIG. 1 having a suspension device in a second position.
Figure 2C:
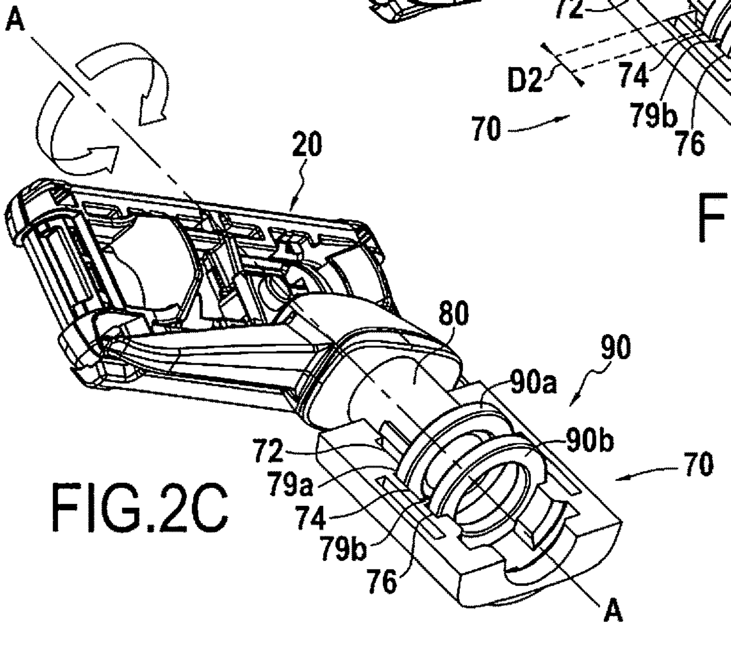
FIG. 2C details a cut-away view of the razor of FIG. 1 having a suspension device in a third position.

FIGS. 2A-2C show a cut-away view of the razor of FIG. 1 with a suspension device 90 in a first, second, and third position, respectively.

FIG. 2A shows the blade assembly 20, the adapter 60, and the suspension housing 70 of razor assembly 100. The suspension housing 70 may be configured to house a suspension device 90. The blade assembly 20 may be connected to the suspension housing 70 via the adapter 60. Each of the components may be disposed along the main axis A-A.

The suspension housing 70 may include a first cavity 72. The first cavity 72 may be disposed on a distal end of the suspension housing 70 and form an opening 72*a* at the outermost end. The first cavity 72 may be configured to house a connector 80. The suspension housing 70 may further include a second cavity 74. The second cavity 74 may communicate with the first cavity 72. The second cavity 74 may be configured to house at least a portion of the first connector 80 and the suspension device 90. The suspension housing 70 may further include a third cavity 76. The third cavity 76 may communicate with the first and second cavities 72, 74. The third cavity 76 may be configured to house at least a portion of the suspension device 90.

The connector 80 may be at least partially disposed within the first cavity 72 of the suspension housing 70 and extend distally therefrom. The connector 80 may be configured to rotate about the main axis A-A relative to the handle 40. The connector 80 may have any suitable shape that permits the connector 80 to rotate about the main axis A-A, in particular, the connector 80 may have a cylindrical shape.

One end of the connector 80 may be removably attached to the adapter 60. The connection between the connector 80 and the adapter 60 may be configured to permit the blade assembly 20, the adapter 60, and the connector 80 to rotate in concert relative to the handle 40.

The other end of the connector 80, i.e., the end opposing the connection to the blade assembly 20 and adapter 60, may be fixed to the suspension housing 70.

The suspension device 90 may include one or more magnets 90*a*, 90*b*. In this example, a first and second magnet 90*a*, 90*b* are used, however it is contemplated that any number of magnets may be used.

The first and second magnets 90*a*, 90*b* may be disposed in the second and third cavities 74, 76 of the suspension housing 70, respectively. The first and second magnets 90*a*, 90*b* may be formed to have similar poles and therefore repel each other. The first magnet 90*a* may be fixed to the connector 80. The second magnet 90*b* may be fixed within the third cavity 76 of the suspension housing 70.

The first and second cavities 72, 74 may be configured to permit the connector 80 and first magnet 90*a* to move along the main axis A-A, relative to the suspension housing 70 and second magnet 90*b*. Additionally, the first magnet 90*a* may be configured to rotate relative to the suspension housing 70, in particular, formed in a circular or an annular shape. The first magnet 90*a* may be fixed to the connector 80 such that it may rotate in concert with the connector 80, adapter 60, and blade assembly 20.

FIG. 2A shows the suspension device 90 in a rest position, or first position. In this position, the repelling magnetic force between the first and second magnets 90*a*, 90*b* of the suspension device 90 urge the first magnet 90*a*, connector 80, adapter 60, and blade assembly 20 distally. A first distance D1 may be formed between the first magnet 90*a* and a distal stop 79*a* when the suspension device 90 is in the rest position. This first distance D1 may be within a range of 0-0.5 mm. The distal stop 79*a* ensures that the connector 80 is prevented from moving distally while also ensuring that the connector 80 has a tolerance to rotate about the main axis A-A.

Turning to FIG. 2B, the suspension device 90 is in a retracted position, or second position. In this position, a pressure is applied to the blade assembly 20 that results in a force that overcomes the repelling force between the first and second magnets 90*a*, 90*b*. This pressure causes the blade assembly 20, adapter 60, connector 80, and first magnet 90*a* to move along the main axis A-A in a proximal direction. During this action, the connector 80 and first magnet 90*a* slide within the first and second cavities 72, 74 of the suspension housing 70, respectively. Once in this retracted or second position, a second distance D2 may be formed between the first magnet 90*a* and the distal stop 79*a*. This distance may be in a range of 2-10 mm. Additionally, a third distance D3 may be formed between opposing surfaces of the first and second magnets 90*a*, 90*b*. This distance may be in a range of 0.1 mm-10 mm.

Once the pressure on the blade assembly 20 results in a force that less than the repelling force between the first and second magnets 90*a*, 90*b*, the blade assembly 20, adapter 60, connector 80, and first magnet 90*a*, are urged distally until the suspension device 90 assumes the rest or first position.

The suspension housing 70 further includes the distal stop 79*a* and a proximal stop 79*b* to contain the movement of the connector 80 and first magnet 90*a* and to prevent the connector 80 and the first magnet 90*a* from being urged out of the opening 72*a* of the suspension housing 70. Further, the suspension device 90 may be in the rest or first position when the connector 80 is contacting the distal stop 79*a* and the suspension device 90 may be in the retracted or second position when the first magnet 90*a* is contacting the proximal stop 79*b* and the connector 80 is not contacting the distal stop 79*a*.

While FIGS. 2A and 2B show the movement of the blade assembly 20, adapter 60, connector 80, and first magnet 90*a* along the main axis A-A, FIG. 2C, shows the rotating capabilities of these components. As aforementioned, the connector 80 may have a cylindrical from so as to be able to rotate within the first cavity 72 of the suspension housing 70. Additionally, the first magnet 90*a* may have a circular or annular shape to rotate within the second cavity 74. This configuration allows the blade assembly 20, adapter 60, connector 80, and first magnet 90*a* to rotate in concert relative to the handle 40. To contain the rotation of the blade assembly 20, adapter 60, connector 80, and first magnet 90*a* relative to the handle 40, the suspension housing 70 and connector 80 further include rotational stops (see FIG. 3A-3B; 78*a*-78*d*; 88*a*-88*d*). The first and second magnets 90*a*, 90*b* may be formed as programmed magnets, or poly-magnets, so that the first and second magnets 90*a*, 90*b* can be programmed to attract or repel each other with a prescribed force and engagement distance, or, to attract or repel at certain a spatial orientation. Thus, the first and second magnets 90*a*, 90*b* may be configured to urge the suspension device 90 into a rest position when offset from the rest position.

Figure 3A:
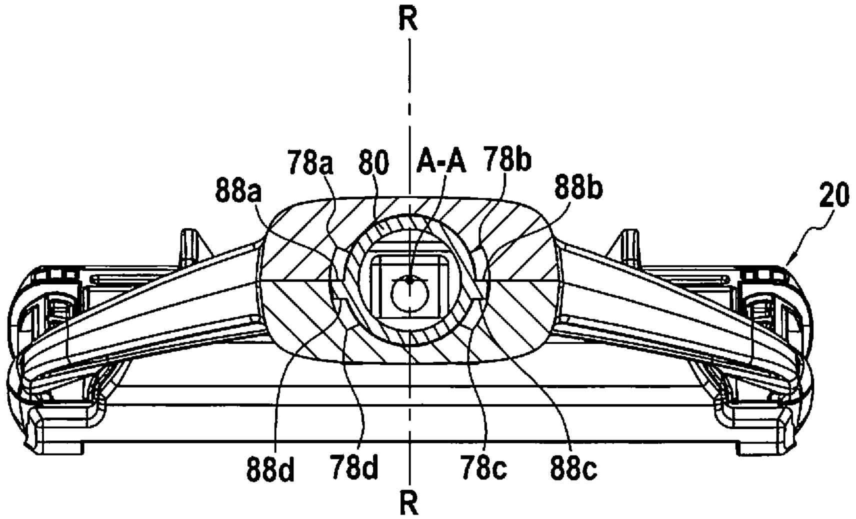
FIG. 3A details a plan view of a cross-section along IIIA of the razor in the first position.
Figure 3B:
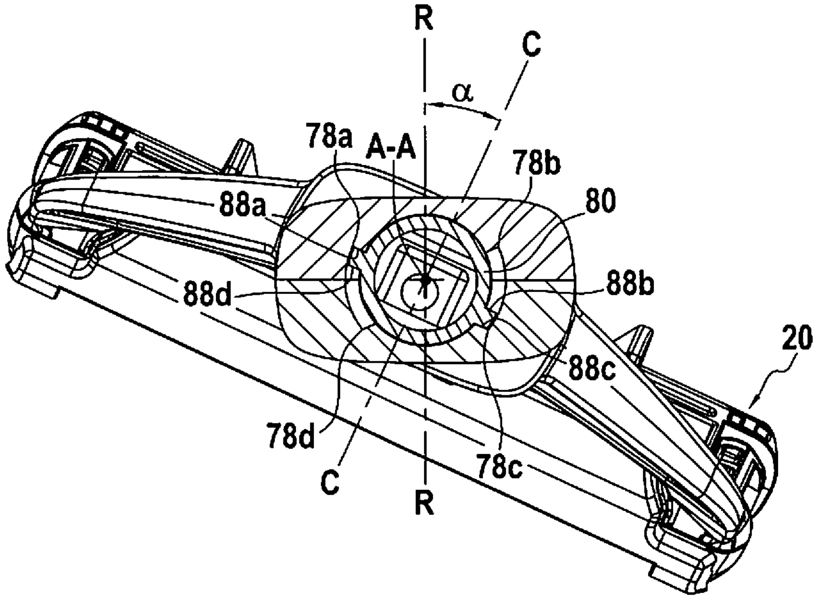
FIG. 3B details a plan view of a cross-section along IIIA of the razor in the third position.

The rotational stops 78*a*-78*d*; 88*a*-88*d* are shown in FIGS. 3A and 3B which show a plan view of a cross-section IIIA of the razor in the first and third positions, respectively.

In particular, FIG. 3A shows the suspension device 90 in a rest or first position. Here a plane R-R is defined by the main axis A-A and is orthogonal to the distal end 40*a* of the handle 40. The connector 80 may include connector rotational stops 88*a*-88*d*. The connector rotational stops 88*a*-88*d* may be formed as shoulders. The first cavity 72 of the suspension device 90 may include housing rotational stops 78*a*-78*d*. The housing rotational stops 78*a*-78*d* may be formed as recesses that are configured to engage the connector rotational stops 88*a*-88*d*.

As can be seen in FIG. 3B, when the blade assembly 20, adapter 60, connector 80, and first magnet 90*a* are rotated relative to the suspension housing 70, the housing rotational stops 78*a*-78*d* and connector rotational stops 88*a*-88*d* are engaged. In this position, the blade assembly 20, adapter 60, connector 80, and first magnet 90*a* are rotated at an angle $\alpha$ relative to the plane R-R. This is shown by a plane C-C which is defined by the main axis A-A and is orthogonal to the distal end of the connector 80. The angle $\alpha$ may be within a range of $-30° \leq \alpha \leq +30°$ relative to the plane R-R.

Turning to FIGS. 4A-4D which detail a cut-away view of the razor assembly 200. The razor assembly 100 of FIGS. 1-3B has several of the same or similar features as the razor assembly 200, however razor assembly 200 shows an alternative suspension device 290. Therefore, like reference symbols will be used and the substantive discussion thereof will be omitted.

Figure 4A:
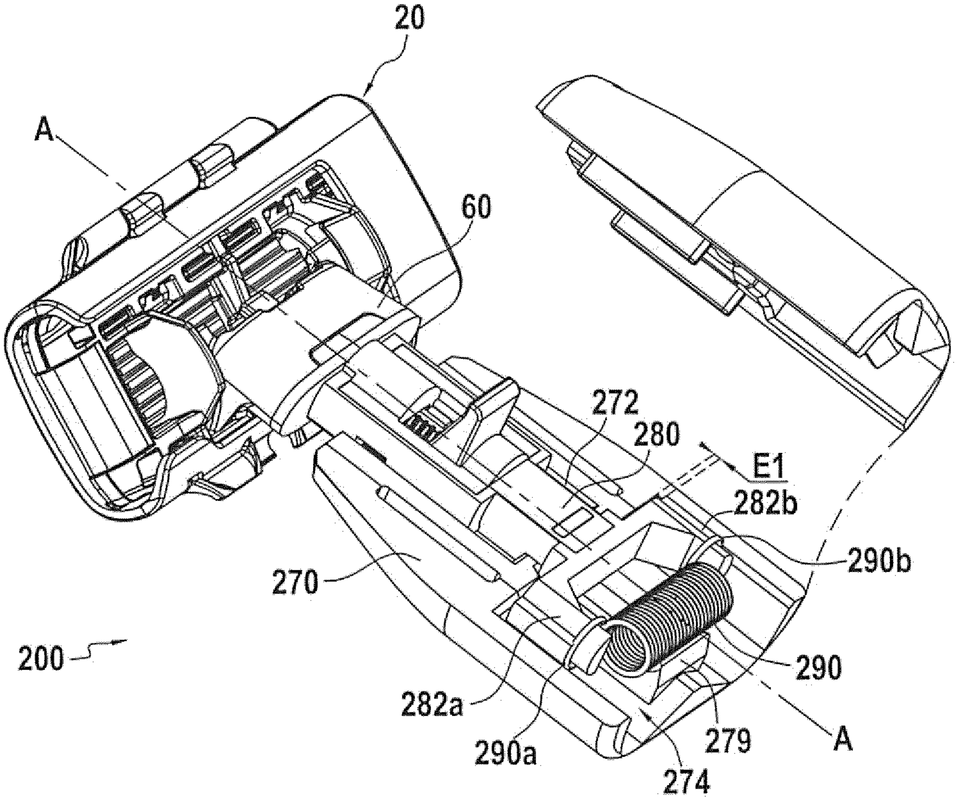
FIG. 4A details a cut-away view of the razor of FIG. 1 having an alternative suspension device in a first position.

As can been seen in FIG. 4A, the razor assembly 200 may include the blade assembly 20, adapter 60, connector 280, and suspension housing 270. Each of the components may be disposed along the main axis A-A.

The second cavity 274 of suspension housing 270 may be configured to house at least a portion of the suspension device 290. The second cavity 274 may further include a stop 279 that is adapted to engage the suspension device 290. The stop 279 may be configured to restrain the movement of the connector 280 via the suspension device 290.

The connector 280 may be at least partially disposed within the first cavity 272 of the suspension housing 270 and extend distally therefrom. The connector 280 may be configured to rotate about the main axis A-A relative to the suspension housing 270. The connector 280 may be any suitable shape that permits the connector 280 to rotate about the main axis A-A, in particular, the connector 280 may be substantially or entirely cylindrical in shape.

The end of the connector 280 opposing the connection to the adapter 60, may be fixed to the suspension device 290. The connector 280 may be formed to have two legs 282*a*, 282*b*. The legs 282*a*, 282*b* of the connector 280 may be formed at the extremities of the suspension housing 270 within the second cavity 274. In other words, each of the legs 282*a*, 282*b* may be offset from the main axis A-A in opposite directions. The legs 282*a*, 282*b* may be configured to connect to the opposing ends of the suspension device 290 such that the suspension device 290 is held taught between the legs 282*a*, 282*b*. The suspension device 290 may include connecting portions 290*a*, 290*b* on the opposing ends of the suspension device 290. The connecting portions 290*a*, 290*b* may be configured to connect with the legs 282*a*, 282*b* of the connector 280.

The suspension device 290 may include a spring. In the example shown, a helical spring is depicted, however it is contemplated that any other type of spring may be used, for example, an elastic bar member.

The first and second cavities 272, 274 may be configured to permit the connector 280 and suspension device 290 to move along the main axis A-A, relative to the suspension housing 270. Additionally, the suspension device 290 may be configured to rotate relative to the suspension housing 270. The suspension device 290 may be attached to each leg 282*a*, 282*b* of the connector 280 via the connecting portions 290*a*, 290*b* such that it may move in concert with the connector 280, adapter 60, and blade assembly 20.

As can be seen in FIG. 4A, the suspension device 290 is in a rest position, or first position. The suspension device 290 is held taut between the legs 282*a*, 282*b* of the connector 280 and is engaging the stop 279. With this configuration, the suspension device 290 holds the connector 280, adapter 60, and blade assembly 20 distally. A first distance E1 may be formed between an upper wall 274*a* of the second cavity 274 and the connector 280. This first distance E1 may be within a range of 0-0.5 mm.

Figure 4B:
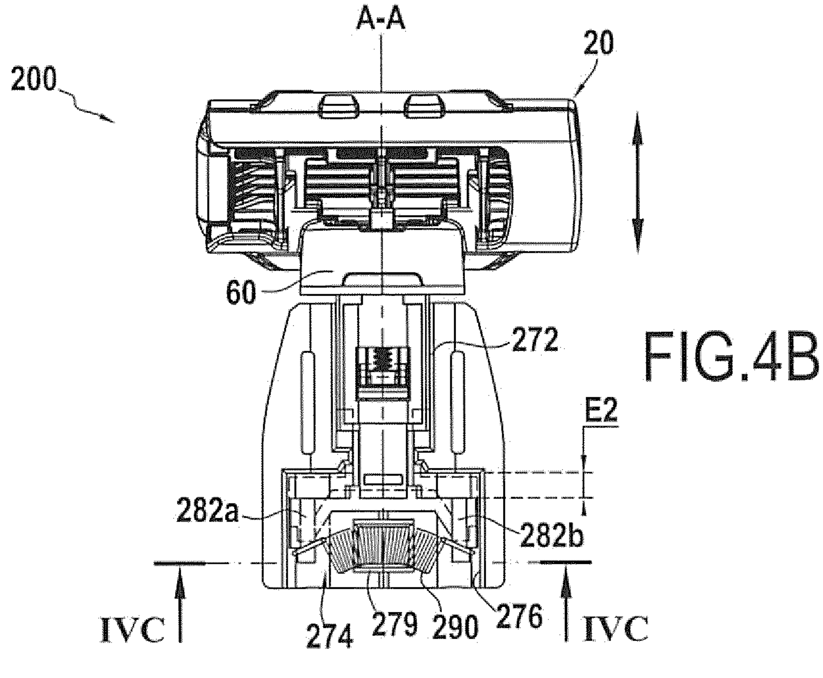
FIG. 4B details a cut-away view of the razor of FIG. 1 having an alternative suspension device in a second position.

Turning to FIG. 4B, the suspension device 290 is in a retracted position, or second position. In this position, a pressure is applied to blade assembly 20 that results in a linear force that overcomes the spring force of the suspension device 290. This pressure causes the blade assembly 20, adapter 60, and connector 280 to move proximally along the main axis A-A. During this action, the connector 280 slides within the first and second cavities 272, 274 of the suspension housing 270 and the suspension device 290 is deformed over the stop 279 formed in the second cavity 274. Additionally, the suspension device 290 remains secured to the legs 282*a*, 282*b* of the connector 280. Once in this retracted or second position, a second distance E2 may be formed between the upper wall 274*a* of the second cavity 274 and the connector 280. This second distance E2 may be within a range of 2-10 mm.

Once the pressure on the blade assembly 20 results in a force that less than the spring force of the suspension device 290, the blade assembly 20, adapter 60, and connector 280 are urged distally until the suspension device 290 assumes the rest or first position.

Figure 4C:
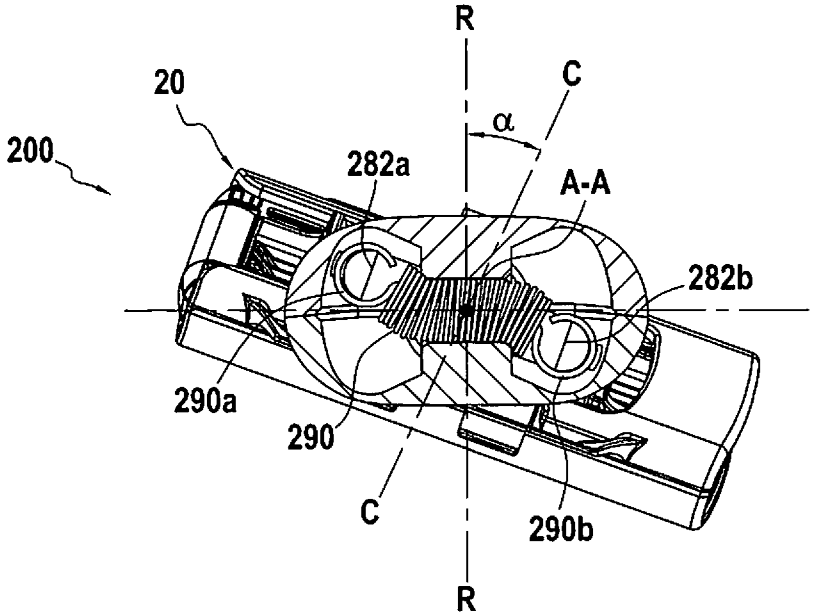
FIG. 4C details a cut-away view of the razor of FIG. 1 having an alternative suspension device in a third position.
Figure 4D:
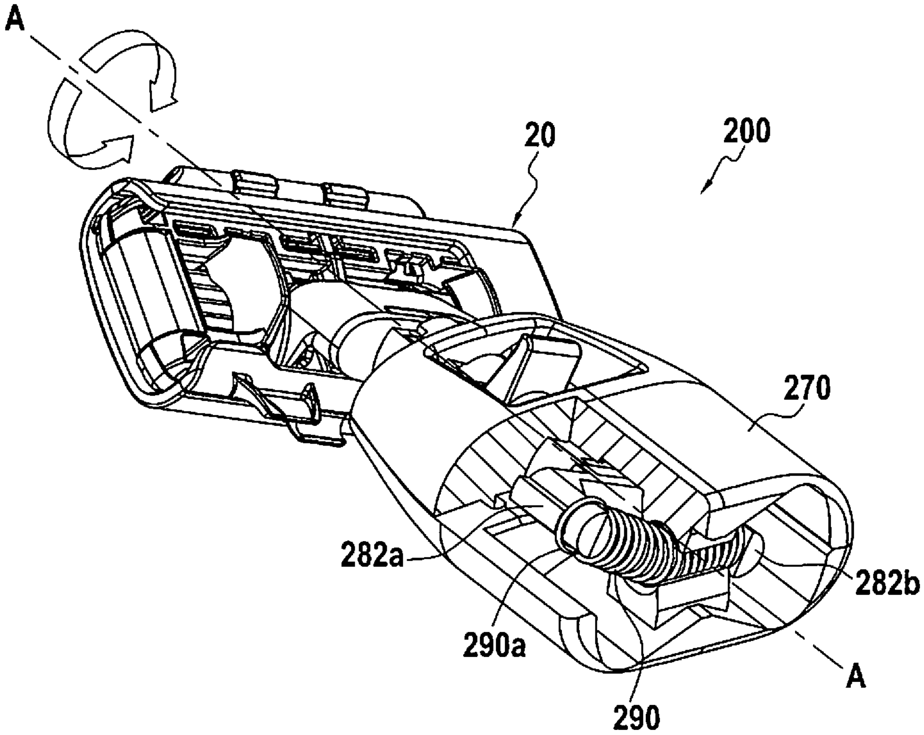
FIG. 4D details a cut-away view of the razor of FIG. 1 having an alternative suspension device in a fourth position.

While FIGS. 4A and 4B show the movement of the razor assembly 200 along the main axis A-A, FIGS. 4C and 4D, show the rotating capabilities about the main axis A-A. As aforementioned, the connector 280 may have a substantially or entirely cylindrical from so as to be able to rotate within the suspension housing 270. Additionally, the legs 282*a*, 282*b* of the connector 280 may be offset from the main axis A-A to form a gap therebetween and each of the legs 282*a*, 282*b* may be attached to corresponding connecting portions 290*a*, 290*b* of the suspension device 290. This configuration allows the blade assembly 20, adapter 60, connector 280, and suspension device 290 to rotate in concert about the main axis A-A relative to the suspension housing 270. Further, the rotation of the connector 280 may be limited to the interior dimensions of the first and second cavities 272, 274 of the suspension housing 270.

When a pressure is applied to blade assembly 20 that results in a rotational force that overcomes the spring force or return force of the suspension device 290, the connector 280 rotates within the first and second cavities 272, 274 of the suspension housing 270 and the suspension device 290 is deformed over the stop 279 formed in the second cavity 274. Additionally, the suspension device 290 remains secured to the legs 282*a*, 282*b* of the connector 280. Once in this rotated or third position, an angle $\alpha$ may be formed relative to the plane R-R. This is shown by a plane C-C which is defined by the main axis A-A and is orthogonal to the distal end of the connector 280. The angle $\alpha$ may be within a range of $-30° \leq \alpha \leq +30°$ relative to the plane R-R.

Once the pressure on the blade assembly 20 results in a force that less than the spring force or return force of the suspension device 290, the blade assembly 20, adapter 60, and connector 280 are urged to rotate until the suspension device 290 assumes the rest or first position.

While aspects of the disclosure have been described in detail in the foregoing description, the same is to be considered as illustrative and not restrictive in character, it being understood that only some aspects have been shown and described and that all changes and modifications that come within the scope of the claims are to be protected. It is intended that combinations of the above-described elements and those within the specification may be made, except where otherwise contradictory. Although aspects of the disclosure have been described, it would be obvious to those skilled in the art that various other changes and modifications can be made without departing from the scope of the claims. It is therefore intended to cover in the appended claims all such changes and modifications that are within the scope of the disclosure.

The invention claimed is:

1. A suspension housing configured to provide a movable connection between a razor blade assembly and a razor handle, the suspension housing comprising:

a connector being movably attachable to the razor blade assembly; and a suspension device operably coupled to the connector, wherein the suspension device is configured to allow axial movement of the connector along a main axis, and rotational movement of the connector about the main axis, and wherein the suspension device comprises two or more magnets.

2. The suspension housing according to claim 1, wherein the suspension housing extends from a proximal end thereof to a distal end thereof along the main axis, and wherein the connector is movably mounted inside the suspension housing such that the connector can move axially along the main axis and rotate about the main axis.

3. The suspension housing according to claim 1, wherein a first magnet of the two or more magnets is fixedly attached to the inside of the suspension housing and a second magnet of the two or more magnets is fixedly attached to the connector.

4. The suspension housing according to claim 3, wherein the first and second magnets have similar poles thereby repelling each other.

5. The suspension housing according to claim 1, wherein the magnets are annular.

6. The suspension housing according to claim 1, wherein the magnets form a pair of correlated magnets.

7. The suspension housing according to claim 1, wherein the magnets are formed as programmed magnets configured to attract or repel each other with a predefined force or predefined engagement distance or predefined spatial orientation.

8. The suspension housing according to claim 1, wherein the magnets are configured to urge the suspension device into a rest position when offset from the rest position.

9. A razor comprising:

a razor blade assembly and the suspension housing according to claim 1, wherein the suspension housing includes a cavity having at least one stop, wherein the at least one stop is configured to limit movement of the connector.

10. The razor according to claim 9, wherein the at least one stop includes a first rotational stop and a second rotational stop configured to limit rotational movement of the connector about the main axis.

11. The razor according to claim 10, wherein the first and second rotational stops are configured to limit the rotational movement of the connector to a range of $-30° \leq 30°$ relative to a rest position, and wherein the connector includes connector stops configured to engage at least one of the rotational stops.

12. The razor according to claim 9, including an adaptor configured to attach the razor blade assembly to the connector.

13. The razor according to claim 9, wherein the razor blade assembly and the connector are adapted to axially translate and/or rotate along the main axis when a force is applied to the razor blade assembly exceeds a return force that the suspension device applies on the razor blade assembly.

* * * * *